United States Patent
Stephens et al.

(10) Patent No.: US 6,752,715 B2
(45) Date of Patent: Jun. 22, 2004

(54) COMBINE HARVESTER GRAIN TANK COVER

(75) Inventors: Nathaniel Herbert Stephens, Moline, IL (US); Corey Ronald Neumann, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/223,194

(22) Filed: Aug. 19, 2002

(65) Prior Publication Data

US 2004/0033823 A1 Feb. 19, 2004

(51) Int. Cl.[7] .......................... A01D 90/10; A01F 12/60
(52) U.S. Cl. .......................... 460/23; 460/119; 296/15; 296/26.07
(58) Field of Search .......................... 460/23, 119, 150; 56/324; 220/315, 345.4, 349, 351

(56) References Cited

U.S. PATENT DOCUMENTS

| | | | |
|---|---|---|---|
| 3,485,524 A | * 12/1969 | Nelson | 296/100.1 |
| 3,842,730 A | * 10/1974 | White et al. | 100/245 |
| 4,218,087 A | * 8/1980 | Neville | 296/100.18 |
| 4,457,444 A | 7/1984 | Wold | 220/213 |
| 4,502,610 A | * 3/1985 | Todd | 220/315 |
| 4,542,911 A | * 9/1985 | Mulligan | 280/423 |
| 4,823,707 A | * 4/1989 | Salsbury et al. | 105/377.02 |
| 5,125,221 A | 6/1992 | Looney | 56/1 |
| 5,151,064 A | 9/1992 | Damman et al. | 460/23 |
| 5,238,288 A | * 8/1993 | Chandler | 296/100.18 |
| 5,427,572 A | * 6/1995 | Deutsch et al. | 460/119 |
| 6,508,705 B1 | * 1/2003 | Van Overschelde | 460/23 |

* cited by examiner

Primary Examiner—Árpád Fab Kovács

(57) ABSTRACT

A grain tank cover having a tarp and support structure, the support structure including legs and an upper frame structure that are shiftable downwardly into the tank to assume a lowered position, and a domed structure extends upwardly from the upper frame structure and supports the tarp in a generally domed configuration in that location.

14 Claims, 4 Drawing Sheets

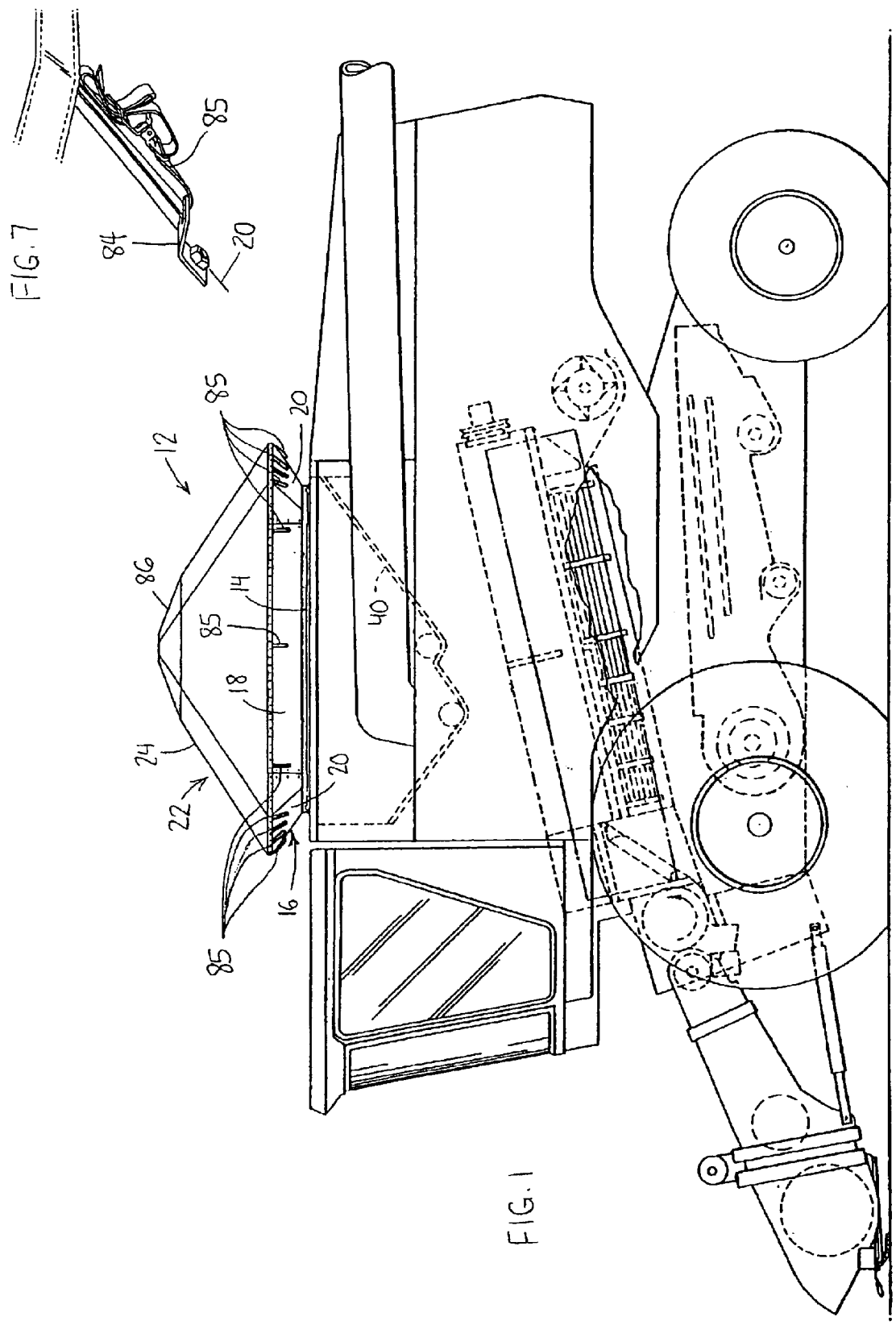

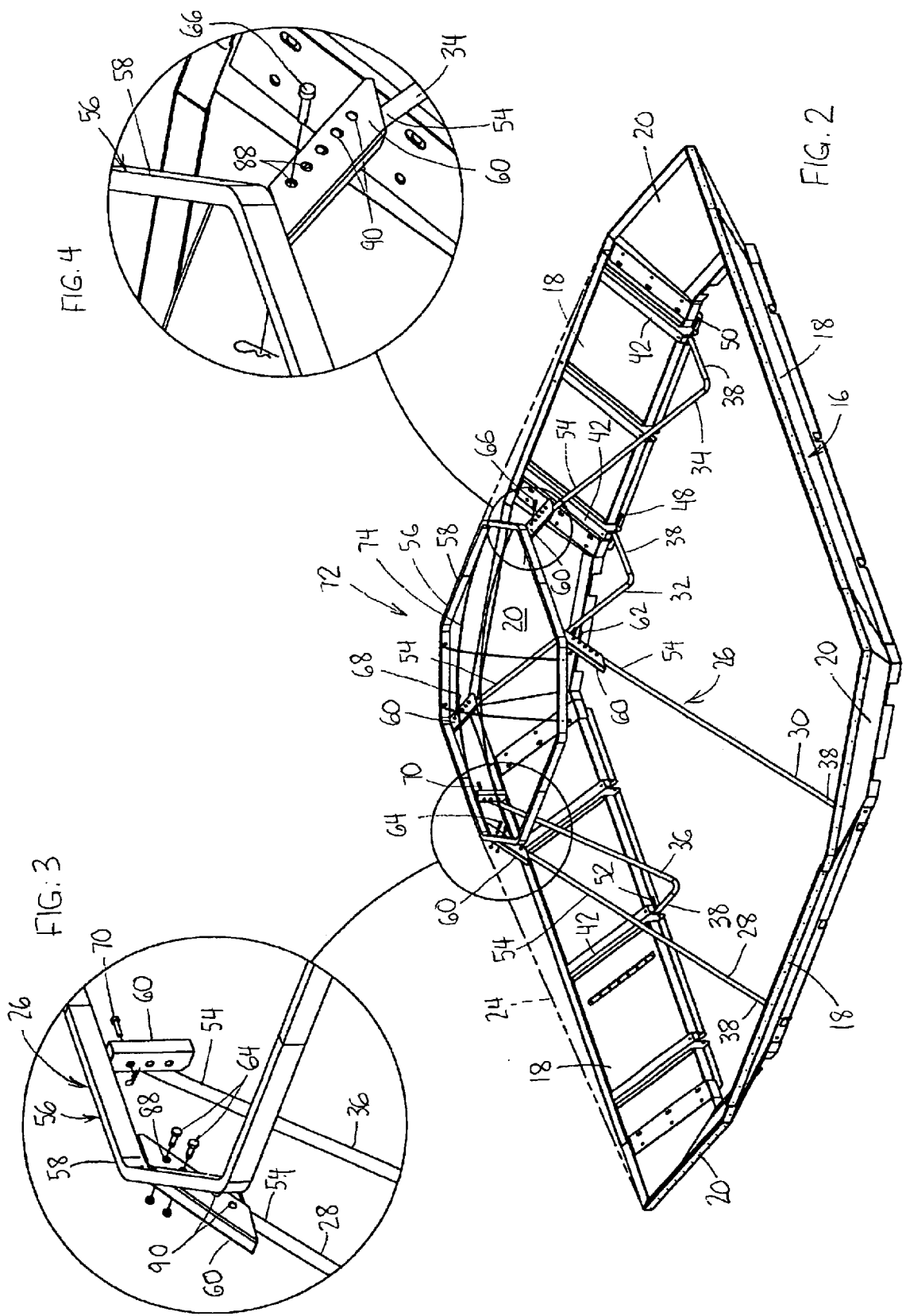

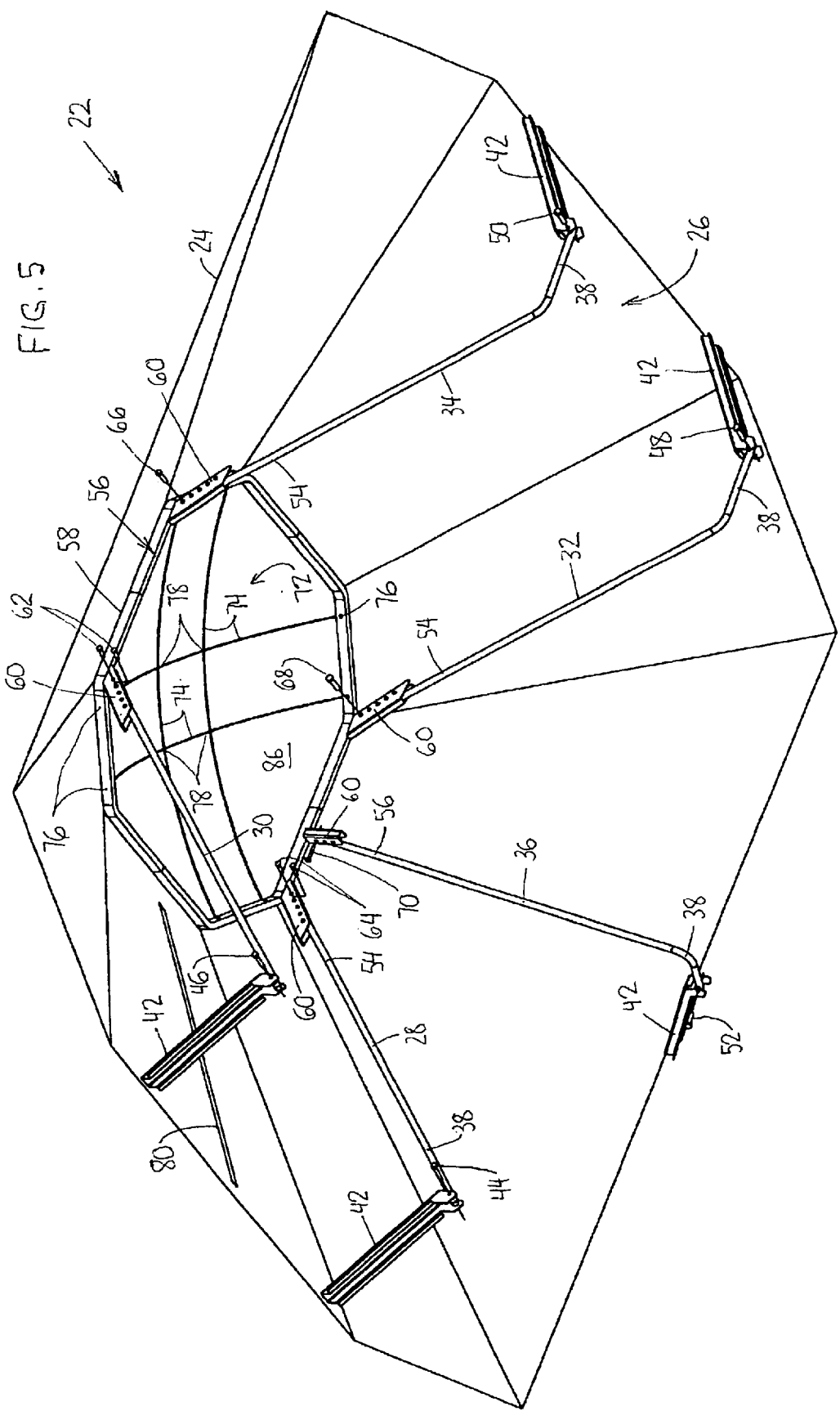

COMBINE HARVESTER GRAIN TANK COVER

FIELD OF THE INVENTION

This invention relates to agricultural combine harvesters and the devices used to cover the grain tanks of such combines.

BACKGROUND OF THE INVENTION

It is known to provide agricultural combine harvesters with a cover that extends over the open top of the vehicle's grain tank. Such covers typically include a waterproof fabric that prevents rainwater and other debris from contacting the grain that accumulates in the grain tank. Many such grain tank covers are cumbersome structures which require considerable time and the use of tools to assemble and disassemble. Other covers include fabric that is ill fitted and allows undesirable pools of water to collect in pocket areas between portions of the support frame. This accumulated water can eventually leak through the fabric and contact the grain in the grain tank. Some prior art grain tank covers must be disassembled and removed from the top of the combine to provide clearance for the combine to pass beneath obstructions such as when passing through a barn door. The assembly and disassembly process for such covers can be undesirably complex and time consuming, subjects the fabric to possible tears, and allows hardware to be misplaced or lost.

SUMMARY OF THE INVENTION

The present invention provides a grain tank cover for a vehicle such as an agricultural combine harvester, wherein the cover includes a tarp and a support structure for supporting the tarp across the otherwise open top of the grain tank. The tarp is secured by straps and buckles to grain tank extensions that extend up from the top edges of the grain tank. The support structure includes legs that are coupled to the grain tank. The top ends of the legs are operatively coupled to each other by way of a frame structure near the top of the support structure. A dome structure is formed by flexible rods that extend across and are carried by the frame structure. The dome structure helps prevent rainwater from accumulating on the tarp.

The tarp and support structure can be shifted between a raised position during operation of the vehicle and a lowered position within the empty grain tank when the vehicle must pass beneath overhead obstructions during vehicle transport. The lower ends of a first set of legs are pivotally coupled with the combine vehicle. The first set of legs remain pivotally coupled to the combine via bolts or pins as the support structure pivots between the raised and lowered positions. The top portion of the first legs are connected as by bolts or pins to brackets which are fixed to the frame structure. The frame structure thereby remains fixed with the first legs as the first legs pivot between the raised and lowered positions.

The support structure also includes a set of second legs. The lower portions of the second set of legs are coupled via quick connection pins to brackets operatively mounted to the combine vehicle. The upper portions of the second set of legs are coupled via quick connection pins to brackets fixed to the frame structure. According to the preferred embodiment of the present invention, the second set of legs are detachable from the frame structure and from the combine vehicle to allow the support structure to be changed from the raised position to the lowered position. When detached from the frame structure and vehicle, the second set of legs can be placed within the grain tank, and then the first set of legs and frame structure fixed thereto can be swung downwardly into the grain tank.

According to an alternative embodiment of the present invention the lower ends of the second legs remain pivotally attached to the vehicle, and can pivot to lowered positions within the grain tank after the upper ends of the second legs are detached from the frame structure.

The tarp shifts downwardly under its own weight as the support structure is lowered, and therefore the support structure and tarp are positioned within the grain tank when in the lowered position.

When the operator wishes to raise the support structure and tarp to their raised position he can do so by stepping into the grain tank and standing in a zippered opening in the tarp. The operator lifts the frame structure, which acts to pivot the first set of legs and frame structure about the pin connections to the grain tank. The operator then grabs one of the second legs and attaches it via a quick connection pin to its respective bracket fixed to the frame structure. While grasping this second leg the operator can then place the lower end of that second leg in the proper position and insert the quick connection pin that holds the lower end in place. When raised in this manner, the frame structure, first set of legs, and the second leg thereby form a rigid structure that bears its own weight and the weight of the tarp, and the operator can use both hands to grab the remaining second legs. The operator can then use both hands to attach the upper portions of the remaining second legs to the frame structure and the lower portions of said legs to the walls of the grain tank. When the support structure is fully assembled the operator can then exit the grain tank through the zippered opening in the tarp, close the zipper and resume harvesting operations.

The present invention thereby provides a grain tank cover that is easy to assemble atop the grain tank, and can be readily collapsed to a lowered position without the use of tools. When in the lowered position the entire grain tank cover according to the preferred embodiment can be positioned within the grain tank. The extensions can then be shifted down into the grain tank in conventional fashion. In the lowered configuration the grain tank cover is positioned beneath the top edge of the grain tank, thereby effectively lowering the height of the vehicle and providing greater clearance for the vehicle to pass beneath obstructions such as low overhead doors during vehicle transport and storage. The grain tank cover can then easily be shifted back to its raised position by an operator without the use of tools.

BRIEF DESCRIPTION OF THE DRAWINGS

FIG. 1 is a side view of an agricultural combine vehicle showing a cross sectional view of the vehicle's grain tank and the grain tank cover according to the present invention shown in place atop the grain tank.

FIG. 2 is a perspective view of the grain tank extensions and grain tank cover shown in its raised position, with the tarp shown in phantom and the grain tank and combine vehicle not shown.

FIG. 3 is a close-up perspective partially exploded view of first and second legs, connection pins, brackets and frame structure of FIG. 2.

FIG. 4 is a close-up perspective partially exploded view of a second leg, quick connection pin, bracket and frame structure shown in FIG. 2.

FIG. 5 is a perspective view of the support structure and tarp in the raised configuration as viewed from beneath, with the combine vehicle, grain tank and extensions not shown.

FIG. 7 is a perspective view of the buckle and strap which secures the tarp to the grain tank extensions.

DESCRIPTION OF THE PREFERRED EMBODIMENT

Figure 6:
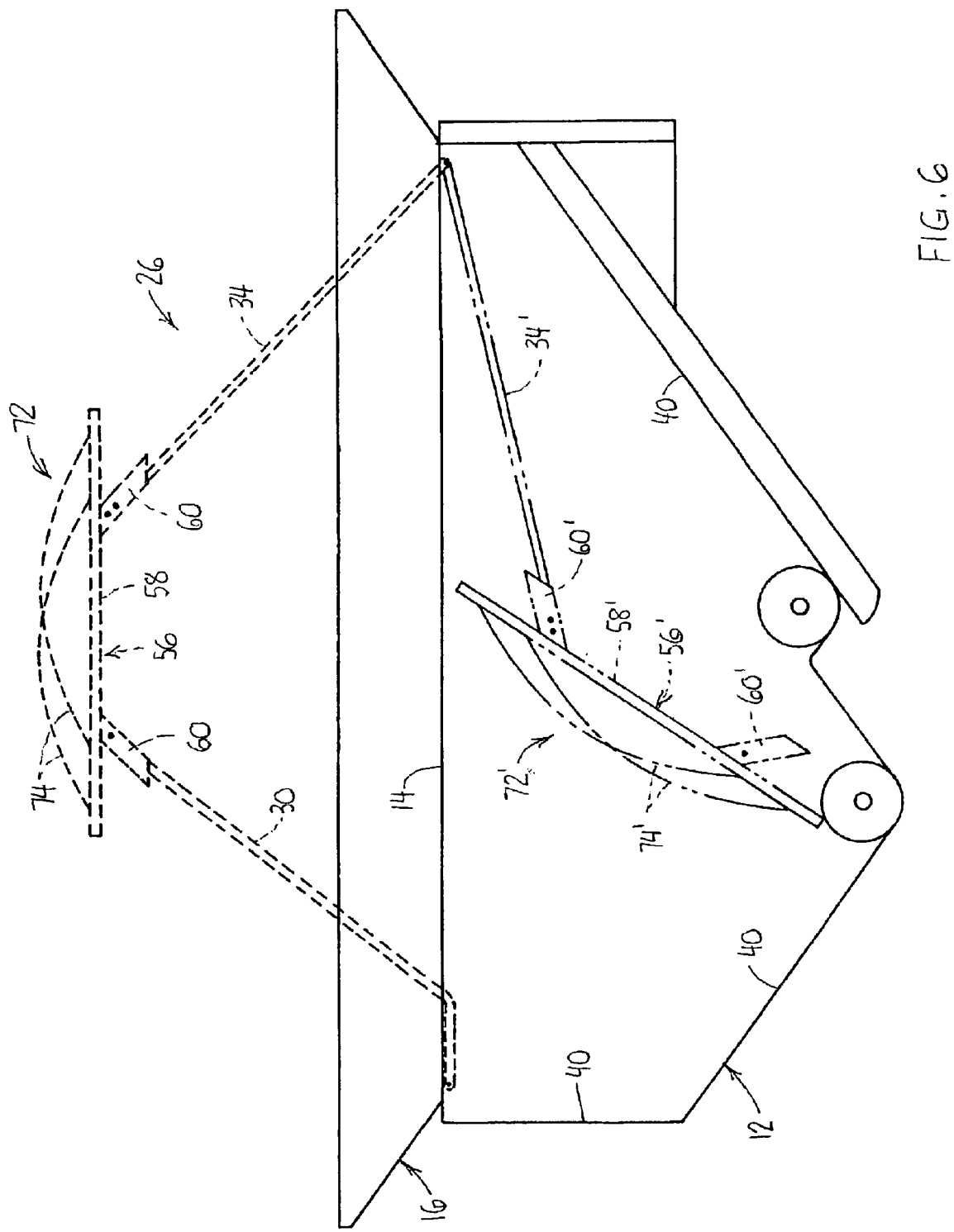
FIG. 6 is a sectional view of the grain tank, and support structure, with the support structure shown in both the raised and lowered positions.

Referring now to the drawings, there is shown in FIG. 1 a side view of an agricultural combine harvester 10. Grain from the crop being harvested is directed into a grain tank 12 located near the top of the combine harvester vehicle 10. At the top 14 of the grain tank 12 are extensions 16 which extend upwardly from the top outer edges 14 of the grain tank 12. The extensions 16 allow grain to accumulate in the grain tank 12 above the top outer edges 14 of the grain tank 12 and thereby hold more grain. The extensions 16 include four rigid side panels 18 and corner portions 20.

The present invention provides a grain tank cover 22 that includes a waterproof fabric tarp 24 supported by a support structure 26 carried by the combine vehicle 10. The support structure 26 according to the preferred embodiment, as best seen in FIGS. 2–6, includes five legs 28, 30, 32, 34, 36 which have lower end portions 38 pivotally coupled to the combine 10 proximate the interior walls 40 of the grain tank 12. Brackets 42 fastened to the extensions 16 receive pin members 44–52 which engage the lower end portions 38 of the legs 28–36. The pins 44 and 46 allow first legs 28 and 30 to pivot about the axes defined by the respective pins 44 and 46. These first legs 28 and 30 pivot about the pins 44 and 46 between raised and lowered positions, as will be described in greater detail below.

When in the raised position, the top portions 54 of the legs 28–36 are operatively connected to each other by way of a frame structure 56. The frame structure 56 comprises a tubular octagonal member 58. Brackets 60 extend from the frame structure 56 and provide structure to which the top portions 54 of the legs 28–36 attach. Pins or bolts 62–70 couple the top portions 54 of the legs 28–36 to the brackets 60 of the frame structure 56.

A dome structure 72 is provided above the frame structure 56. Flexible rods 74 each extend in arcs from one side of the frame structure 56 to the other. The ends of the rods 74 are positioned within openings 76 defined in the frame structure 56. Where the rods 74 cross each other cable ties 78 are provided for ridigifying the dome 72 and frame structure 56.

The rear of the tarp 24 includes an opening 80 having a zipper that can be opened by an operator to allow the operator ingress and egress from the grain tank 12 while the tarp 24 and support structure 26 are coupled to the combine 10. The operator can open the zipper and pass through the opening 80 to enter the empty grain tank 12 to shift the tarp 24 and support structure 26 between the raised and lowered positions. Steps formed in the side walls 40 of the grain tank 12 help allow an operator to maintain adequate footing within the grain tank 12. The operator can exit the grain tank 12 through the zippered opening 80 when he has finished raising or lowering the support structure 26.

The tarp 24 is connected to the extensions by way of respective buckles 84 and straps 85 or other suitable connection mechanisms. As best seen in FIG. 7, the straps 85 extend downwardly from the lower edge of the tarp 24. The strap 85 is wound through a respective buckle 84 which is fixed as by bolts to an extension 16. The tarp 24 remains coupled to the extensions 16 by way of the straps 85 and buckles 84 when the cover 22 is in both the raised and lowered configurations.

Next, the operation of the present invention will be described in greater detail. When in the raised configuration the tarp 24 and support structure 26 are as shown in FIGS. 1–5. To change the tarp 24 and support structure 26 to the lowered configuration, the operator can unzip the zippered opening 80 to enter the empty grain tank 12 and pass beneath the tarp 24. While standing in the grain tank 12 beneath the frame structure 56 the operator can detach the quick connection pins 48 and 50 which couple the lower end 38 of front legs 32 and 34 to the respective brackets 42. The operator also detaches the lower end 38 of laterally extending leg 36 by removing the quick connection pins 52 from the respective bracket 42. After the lower ends 38 of these three legs 32, 34, 36, referred to herein as second legs, are detached from the respective brackets 42 the operator then can detach them from the frame structure 56 by removing the respective quick connection pins 66, 68, 70 that couple the second legs 32, 34, 36 to the frame structure 56. The operator thereby detaches the second legs 32, 34, 36 from the vehicle 10 and then the frame structure 10, and lays them in the grain tank 12. With the three second legs 32, 34, 36 in their lowered positions within the grain tank 12, the operator can then swing the rear two legs 28 and 30 and frame structure 56 downwardly into the grain tank 12. The rear two legs 28 and 30, referred to herein as first legs, and the frame structure 56 remain bolted together and therefore pivot as a unit about the axes defined by the pins 44 and 46 within the brackets 42 at the rear of the grain tank 12. As these first legs 28, 30 and frame structure 56 swing downwardly, the tarp 24 falls under its own weight into the grain tank 12. When in a lowered position, the tarp 24 and support structure 26 are positioned within the grain tank 12, and thereby allow clearance for the extension side panels 18 to be swung inwardly and downwardly into the grain tank 12 as well. So in the lowered configuration the support structure 26, tarp 24 and extensions 16 are positioned within the grain tank 12 and thereby provide clearance for the combine vehicle 10 to pass beneath low overhead obstructions, such as through the doors of barns or storage buildings.

When the operator wants to raise the cover 22 prior to resuming harvesting operations, the operator lifts the extensions 16 to their raised positions. The operator then stands in the zippered opening 80 and lifts the frame structure 56 upwardly, which serves to raise the tarp 24. As the operator lifts the frame structure 56, the frame structure 56 and first legs 28, 30 pivot as a unit about the pins 44, 46 at the rear of the grain tank 12. Once the frame structure 56 and the pair of first legs 28, 30 are raised, the operator can more readily enter the tarp 24 and grasp one of the second legs such as 32 laying in the grain tank 12. The operator connects this second leg 32 to the bracket 60 of the frame structure, and then connects the lower end of this second leg 32 to the respective bracket 60 carried by the extension 16. With these three legs 28, 30, 32 coupled to and supporting the frame structure 56, the frame 56 will remain supported in the raised position such that the operator no longer needs to manually hold up the support structure 26 beneath the tarp 24. The operator can then proceed to locate the remaining second legs 34 and 36 and use both hands to fasten them to the respective brackets 60 of the frame structure 56 by way of quick connection pins 50, 52. The operator can then couple the lower ends 38 of these remaining legs 34 and 36 to the respective brackets 42 mounted to the extensions 16. With all the legs 28, 30, 32, 34, 36 coupled to each other by way of the frame structure 56, the support structure 26 is firmly held in the raised configuration. The operator then exits the grain tank 12 via the zippered opening 80, closes the zipper behind him, and proceeds with harvesting operations.

The brackets 60 fixed with the frame structure 56 have several openings 88, 90 which allow the legs 28, 30, 32, 34, 36 to be connected to the brackets 60 at a plurality of locations. If the tarp 24 becomes stretched after long periods of operation the operator can couple the legs 28, 30, 32, 34, 36 to the brackets by way of the lower openings 90 in the brackets 60, which will serve to support the frame structure 56 at a higher elevation above the grain tank 12. This will serve to compensate for stretch in the tarp 24, and thereby help eliminate pooling of water on the tarp 24 by keeping the tarp 24 supported in a relatively taut fashion.

The preferred embodiment shows the legs 28, 30, 32, 34, 36, frame 56 and extensions 16 being shiftable into the interior of the grain tank 12 to reduce the profile of the combine 10 and provide maximum clearance for the combine vehicle 10 to pass beneath overhead obstructions and beneath doors. However, the support structure 26 could also be provided such that a portion of it extends above the top edge 14 of the grain tank 12 when in the lowered configuration. Similarly, the grain tank cover 22 according to the present invention could be used with extensions 16 that are not swingable downwardly into the grain tank 12. The present invention could also be used with a combine grain tank 12 having no extensions. In any event, the grain tank cover 22 according to the present invention is collapsible to a lowered position that effectively lowers the profile of the combine vehicle 10 such that it can pass beneath lower obstructions than when the cover 22 is in the raised configuration.

The preferred embodiment shown in the drawings includes five legs 28, 30, 32, 34, 36 which support the frame structure 56. The side leg 36 adds lateral rigidity to the support structure 26. However, a different number of legs can be provided, or at different locations, within the spirit of the present invention. Also, the brackets 42 are shown in the drawings and described above as being mounted to the grain tank extensions 18. The brackets 42 which support the lower ends 38 of the legs 28, 30, 32, 34, 36 could also be mounted to the interior walls 40 of the grain tank 12.

When in the raised position, the flexible rods 74 which help define the dome portion 72 support the tarp 24 in such a manner that the tarp 24 does not sag in that location. The rods 74 therefore prevent water from accumulating in that vicinity. The rods 74 also lend rigidity to the frame structure 56.

The embodiment shown in FIGS. 1–6 shows a plurality of second legs 32, 34, 36 that are detached or disengaged from the combine vehicle 10 when the support structure 26 is shifted to the lowered configuration. Alternative embodiments of the present invention could also be provided with second legs 32, 34, 36 whose lower portions 38 remain pivotably coupled to the combine vehicle 10 as the second legs 32, 34, 36 shift to their lowered positions. For example, the second legs 32, 34, 36 could pivot to lowered positions about their respective pin connections 48, 50, 52 with the brackets 42. In the lowered position the second legs 32, 34, 36 would be adapted to provide clearance for the first legs 28, 30 and frame structure 56 to pivot downwardly into the grain tank 12 to assume their lowered position.

The corner portions 20 of the extensions 16 are shown as rigid members that can be detached from the combine 10 and placed in the grain tank 12 when the grain tank cover 22 is shifted to the lowered position. Corner members 20 could also be provided of a flexible fabric material, which could remain attached to the rigid side panels 18 as the side panels 18 pivot between their raised and lowered orientations.

The preferred embodiment of the present invention is described above and shown in the drawings as being adapted for use with an agricultural combine harvester vehicle, but is also readily adaptable for use on other vehicles having open topped containers for carrying materials, liquids or grains. An example of one such vehicle is a grain wagon.

Having described the preferred embodiment, it will become apparent that various modifications can be made without departing from the scope of the invention as defined in the accompanying claims.

What is claimed is:

1. A cover for a vehicle tank having an open top, comprising:
   a tarp portion,
   a support structure for supporting the tarp above the tank, said support structure having first and second legs which are coupled at lower ends to the vehicle, and the top portions of the legs are operatively coupled to each other when in a raised position, the top portions of the leg portions being detachable from each other, and when detached from each other said legs are shiftable downwardly to assume a lowered position with the tarp also assuming a lowered position,
   a frame structure which extends between the upper portions of the legs when in the raised position,
   and a domed portion is coupled with and extends upwardly from the frame structure at the top of the cover.

2. The invention of claim 1, wherein the legs are positioned within the tank when in the lowered position, and the tarp is positioned in the tank when in the lowered position.

3. The invention of claim 2, wherein the lower portions of the legs are attached to the vehicle within the tank when in the raised position.

4. The invention of claim 1, wherein the lower portions of at least one first leg is pivotally coupled to the vehicle within the tank.

5. The invention of claim 4, wherein the lower portion of the first leg remains pivotally coupled with the vehicle as said at least one first leg pivots between the raised and lowered positions.

6. The invention of claim 1, wherein said domed portion further comprises arched ribs coupled with and arching upwardly from the frame structure.

7. The invention of claim 1, wherein said second leg is detachable from the frame structure for allowing the first leg to shift to the lowered position, said frame structure remaining coupled to the first leg as said first leg shifts downwardly to the lowered position.

8. The invention of claim 1, wherein said tarp further comprises an opening through which an operator may pass to shift the tarp and support structure between the raised and lowered positions.

9. A cover for a an agricultural combine vehicle grain tank having an open top, comprising:
   a tarp portion,
   a support structure for supporting the tarp above the grain tank, said support structure having first and second legs which are coupled at lower ends to the agricultural combine vehicle, and the top portions of the legs are operatively coupled to each other when in a raised position, and when detached from each other said legs are shiftable downwardly into the grain tank to assume a lowered position within the grain tank with the tarp also assuming a lowered position within the grain tank, the lower portions of at least one first leg is pivotally coupled to the agricultural combine vehicle, and remains pivotally coupled to the agricultural combine vehicle as the first leg pivots between the raised and lowered positions, a frame structure which extends between the upper portions of the legs when in the raised position, said second leg is detachable from the frame structure for allowing the first leg to pivot to the lowered position, said frame structure remaining coupled to the first leg as said first leg pivots downwardly to the lowered position, and a domed portion is coupled with and extends upwardly from the frame structure at the top of the cover.

10. The invention of claim 9, wherein the first leg is coupled to the agricultural combine vehicle within the grain tank.

11. The invention of claim 9, wherein said domed portion further comprises arched ribs coupled with and arching upwardly from the frame structure.

12. The invention of claim 9, wherein said tarp further comprises an opening through which an operator may pass to shift the tarp and support structure between the raised and lowered positions.

13. The invention of claim 12, wherein the first leg is coupled to the agricultural combine vehicle with the grain tank.

14. The invention of claim 13, wherein the first leg, frame structure, second legs and tarp are positioned within the grain tank when in the lowered position.

* * * * *